United States Patent [19]
Thompson et al.

[11] Patent Number: 6,073,655
[45] Date of Patent: Jun. 13, 2000

[54] HIGH PRESSURE/VACUUM ISOLATION APPARATUS AND METHOD

[75] Inventors: Allen Thompson, San Carlos, Calif.; Shannon Hart, Austin, Tex.

[73] Assignee: Applied Materials, Inc., Santa Clara, Calif.

[21] Appl. No.: 09/038,255

[22] Filed: Mar. 10, 1998

[51] Int. Cl.[7] .................................................. F16K 24/00
[52] U.S. Cl. .......................... 137/885; 137/14; 137/861
[58] Field of Search ............................... 137/14, 861, 885

[56] References Cited

U.S. PATENT DOCUMENTS

| | | |
|---|---|---|
| Re. 29,679 | 6/1978 | Boitnott . |
| 4,688,757 | 8/1987 | Cook et al. . |
| 5,226,632 | 7/1993 | Tepman et al. ....................... 251/335.3 |
| 5,343,946 | 9/1994 | Morrill . |
| 5,363,872 | 11/1994 | Lorimer ........................... 251/335.3 X |
| 5,419,532 | 5/1995 | Fan . |
| 5,433,238 | 7/1995 | Cannizzaro et al. ....................... 137/14 |

*Primary Examiner*—Gerald A. Michalsky
*Attorney, Agent, or Firm*—Dugan & Dugan LLP

[57] ABSTRACT

A valve system is provided for operatively coupling a high pressure source to a processing chamber that selectively cycles between high pressure and vacuum. The valve system includes a branch passageway that selectively communicates a source of intermediate pressure to a main passageway that couples the high pressure source to the processing chamber. The source of intermediate pressure may comprise a vent, a pump, or a source of pressurized fluid, etc. An inventive valve for sealing between the intermediate pressure and the vacuum pressure is also provided. The inlet of the valve is operatively coupled to the high pressure source (via one or more valves) and the outlet of the valve is operatively coupled to the processing chamber (via one or more valves). The valve stem is in continuous fluid contact with the inlet and is configured for high pressure sealing, and the outlet is configured for low pressure sealing and preferably comprises a resilient sealing member.

15 Claims, 5 Drawing Sheets

HIGH PRESSURE/VACUUM ISOLATION APPARATUS AND METHOD

BACKGROUND OF THE INVENTION

Recent advances in semiconductor fabrication techniques require a valve system capable of sealing between both a high pressure region and a vacuum pressure (i.e., low pressure) region. Valve systems currently used for such applications are unable to provide the reliability the semiconductor fabrication field demands. Specifically, the valves employed within conventional valve systems are unable to provide a sufficiently repeatable seal between such large pressure differentials.

Conventional valve systems employ a high pressure valve having a high pressure inlet for connecting to a high pressure gas source, and an outlet for connecting to a vacuum chamber. A "seal" is formed by moving a sealing member having a conical shaped end into a sealed position, such that the conical shaped end is forced into a conical shaped region of the outlet, typically called a seat. The metal surfaces of the sealing member's conical shaped end and the outlet's conical shaped region deform when forced against each other and thereby form a high vacuum seal. However, after a surprisingly small number of sealing cycles, the magnitude of metal-to-metal deformation required to provide a seal is no longer experienced and leakage of the high pressure gas to the low pressure side of the valve occurs. In many situations processing must cease while the high pressure valves are refurbished or replaced. Thus, when a high pressure valve is used in conjunction with a semiconductor processing chamber, where leakage through the valve will affect the vacuum level in the processing chamber, the extreme pressure differential across the conical shaped valve piece causes intolerably unreliable valve performance, and exceedingly brief valve lifetimes.

A second type of valve is available which uses a non-metallic resilient seal to "prevent" high pressure leakage. Similarly, where such vacuum type resilient seals are used, their useful life is hindered by the resilient material's tendency to extrude under high pressure, which will cause catastrophic failure of the valve if the valve is opened with high pressure on its inlet, resulting in contamination of the vacuum chamber.

Accordingly, a need exists for a valve and valve system capable of repeated effective sealing between high pressure and vacuum regions.

SUMMARY OF THE INVENTION

The present invention provides a valve system and method for reducing the pressure differential experienced within a given valve, and an inventive valve configured for simultaneous sealing of high pressure and vacuum pressure regions. Using the inventive valve system, leakage of a valve that seals between a high pressure region and a vacuum region (i.e., a high pressure/vacuum valve) and the inability to achieve the required vacuum levels for chamber operation are significantly diminished.

In one aspect, the invention provides a valve system for selectively altering the pressure applied to one side of a high pressure/vacuum valve. In this manner the largest contributor to high pressure/vacuum valve leakage (i.e., the pressure differential experienced by the valve) is decreased. Pressure differential decrease is achieved by inclusion of a branch fluid passageway that selectively couples a pressure altering mechanism (e.g., a pressurized gas, a vent, or a vacuum pump) to one side of a high pressure/vacuum valve when the valve is closed. In a specific aspect of the invention the pressure altering mechanism is coupled to the valve system's main fluid passageway between two valves that are exposed or potentially exposed (e.g., in the event of leakage from an upstream or down stream valve) to both high pressure and vacuum pressure (high pressure/vacuum valves). In this aspect the pressure differential across both high pressure/vacuum valves is decreased thereby reducing the potential for valve leakage.

In a further aspect the inventive valve system further benefits from use of an inventive valve configured for optimal performance within the inventive valve system. The inventive valve comprises a high pressure stem seal and a vacuum seat seal. The stem seal is coupled in continuous fluid communication with a high pressure inlet port, and the vacuum seat seal is positioned to selectively seal an outlet port which, in operation, is coupled to a chamber that is selectively cycled between high pressure and vacuum pressure.

In a preferred embodiment the inventive valve comprises a valve stem having a sealing plate. A high pressure packing is positioned between the stem and the walls of the valve chamber. The sealing plate has a circumference greater than the circumference of the outlet port, and the surface of the sealing plate facing the outlet port comprises the vacuum seat seal (i.e., a resilient sealing surface).

The resilient sealing surface exhibits a much longer useful life for sealing vacuum pressures than does the metal-to-metal seal of prior art valves, and the overlap created by the larger circumference of the sealing plate provides a large tolerance vacuum seal, i.e., the circumferential differences between the sealing plate and the outlet port allow the inventive valve to be manufactured with much larger tolerances than prior art high pressure valves, which seal with two intersecting conical surfaces. Accordingly, lower manufacturing costs are realized. Due to the reduced pressure differential applied across a given high pressure/vacuum valve, the configuration of the inventive valve system reduces the probability of resilient material extrusion due to high pressure.

Within the inventive valve, the surface of the sealing plate that faces the outlet port (i.e., the sealing surface) and the surface of the sealing plate opposite the sealing surface (i.e., the sealing plate's top surface) are preferably parallel. Therefore, when the sealing plate is in a sealed position, high pressure fluid from the inlet port will exert a force against the sealing plate's top surface, forcing the sealing surface firmly against the outlet port, and further enhancing the vacuum seal.

Accordingly the present invention provides a valve system and method that increases the effectiveness of high pressure/vacuum valves used therein, and provides a longer lasting and more effective high pressure/vacuum valve for use within the inventive valve system.

Other objects, features and advantages of the present invention will become more fully apparent from the following detailed description of the preferred embodiments, the appended claims and the accompanying drawings.

DETAILED DESCRIPTION OF THE PREFERRED EMBODIMENTS

Figure 1A:
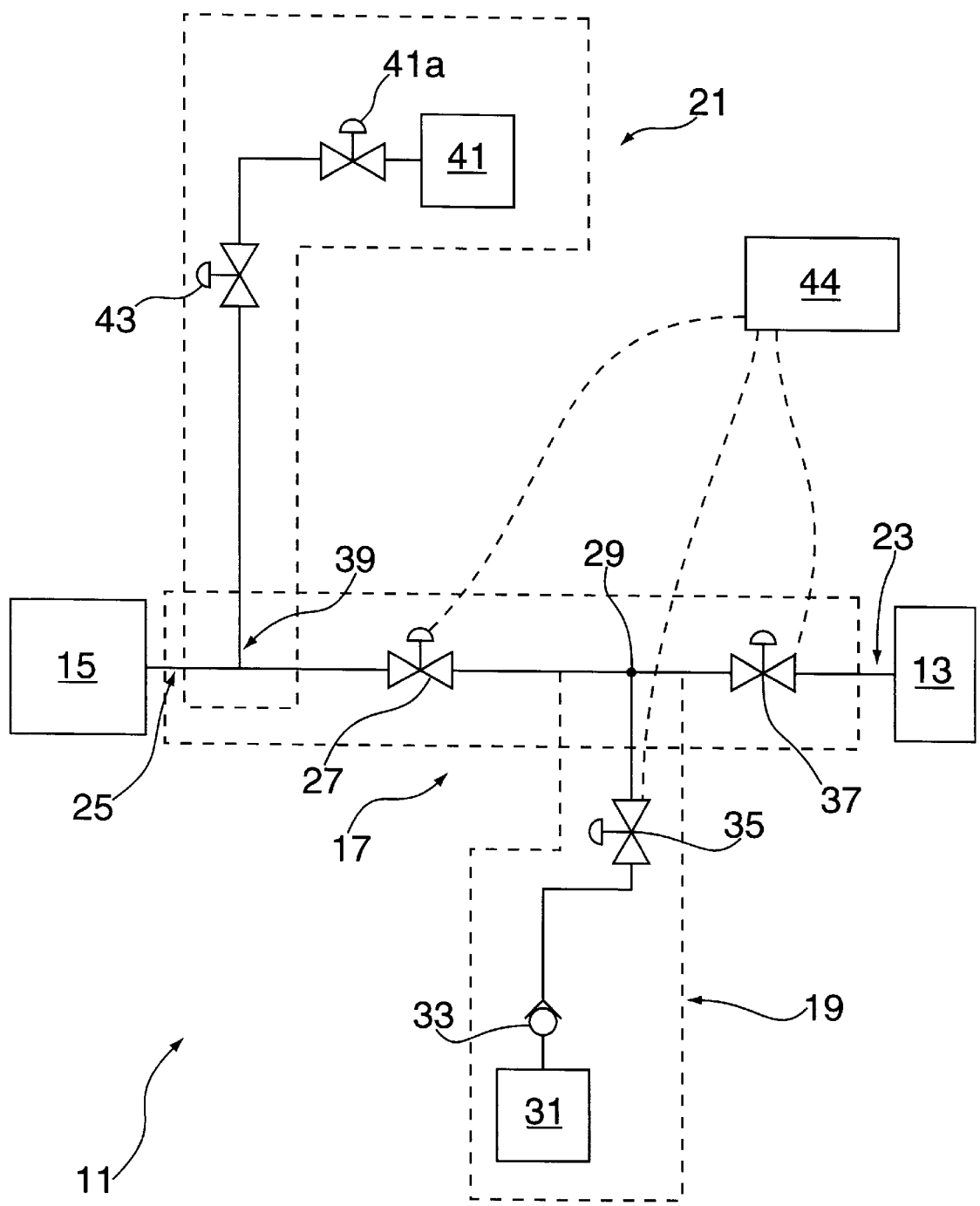
FIG. 1A is a schematic view of an inventive valve system that employs a vent to reduce the pressure differential across the system's high pressure/vacuum valves.

FIG. 1A is a schematic drawing of a valve system 11 that selectively provides high pressure fluid to, or isolates high pressure fluid from a processing chamber. The exemplary valve system 11 is shown coupled to a high pressure source 13, and to a processing chamber 15, and comprises three fluid passageways; a main fluid passageway 17, a branch fluid passageway 19, and an outlet fluid passageway 21. The main fluid passageway 17 selectively provides high pressure fluid from the high pressure source 13 to the processing chamber 15, the branch fluid passageway 19 selectively alters the pressure differential seen by the high pressure/vacuum valves in the main fluid passageway 17, and the outlet fluid passageway 21 carries high pressure fluid from the processing chamber 15.

An inlet of the main fluid passageway 17 (i.e., high pressure source inlet 23) operatively couples to the high pressure source 13, and an outlet of the main fluid passageway 17 (i.e., chamber outlet 25) operatively couples to the processing chamber 15. A first isolation valve 27 is coupled to the main fluid passageway 17 at a position intermediate the high pressure source inlet 23 and the chamber outlet 25.

The branch fluid passageway 19 operatively couples to the main fluid passageway 17 at a first location 29 intermediate the first isolation valve 27 and the high pressure source inlet 23. The branch fluid passageway 19 comprises a first vent 31 and a first check valve 33, operatively coupled between the first vent 31 and the first location 29, for blocking fluid flowing along the branch fluid passageway 19 toward the first location 29. A second isolation valve 35 is coupled to the branch fluid passageway 19 at a position intermediate the first location 29 and the first vent 31 for selectively providing fluid communication between the main fluid passageway 17 and the branch fluid passageway 19. A third isolation valve 37 is coupled along the main fluid passageway 17 at a position between the first location 29 and the high pressure source inlet 23. The first check valve 33 has a closing force selected to prevent backflow of atmosphere into the main fluid passage way 17. Thus a pressure of 10 to 30 psi results between the first isolation valve 27 and the third isolation valve 37.

Figure 2A:
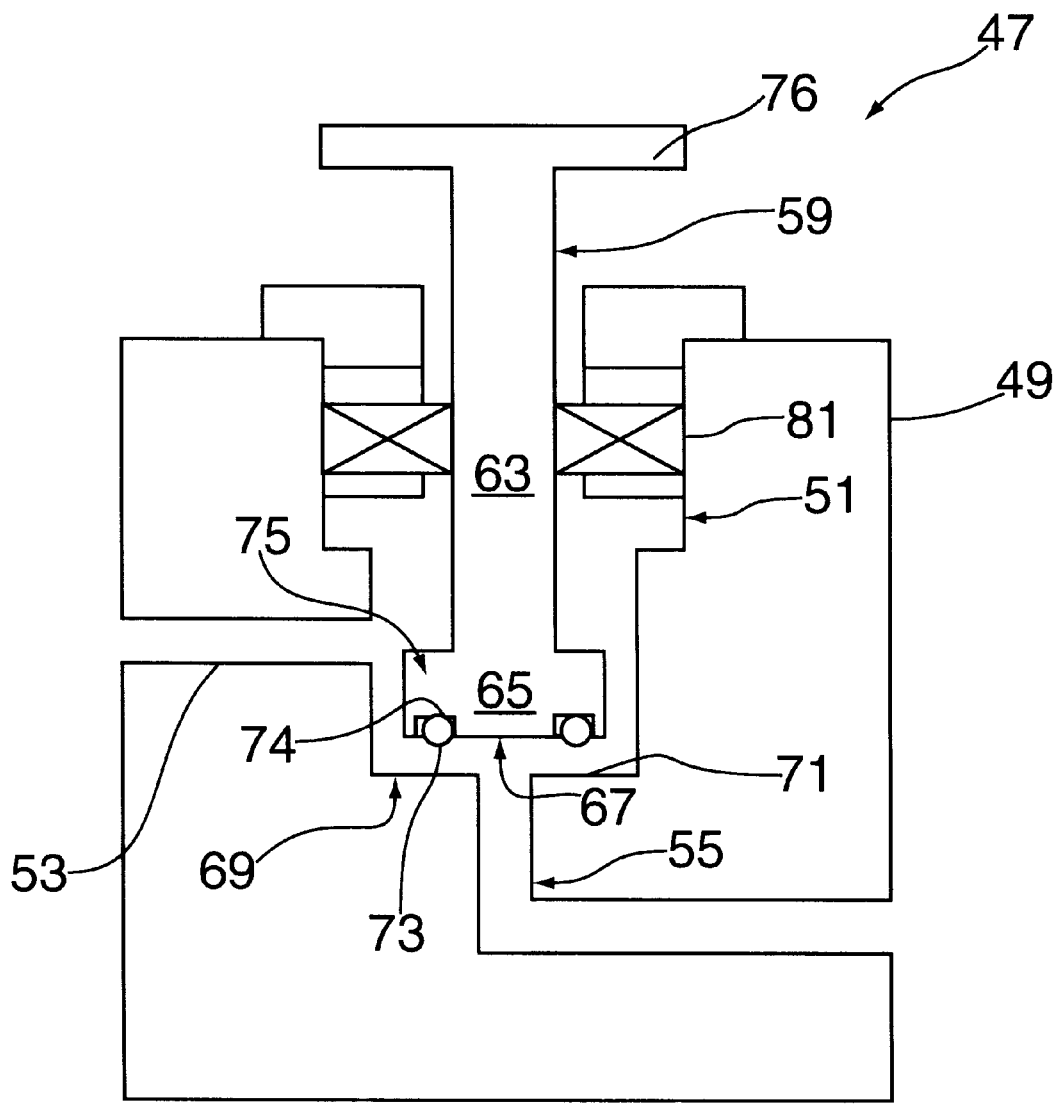
FIGS. 2A and 2B are side elevational views, in section, of an inventive valve configured for use with a valve system such as the valve systems of FIGS. 1A–C.

The outlet fluid passageway 21 has a chamber inlet port 39 for coupling to an outlet port of the processing chamber 15, or for coupling to the main fluid passageway 17 at a position intermediate the chamber outlet 25 and the first isolation valve 27 (as shown in FIG. 2A). The outlet fluid passageway 21 further comprises a second vent 41, a conventional high pressure valve 41a and an optional valve 43 (configured like the inventive valve shown and described with reference to FIGS. 2A–B) coupled between the chamber inlet port 39 and the conventional high pressure valve 41a.

Although the first isolation valve 27, the second isolation valve 35 and the third isolation valve 37 may be manual valves, they are preferably automatically controlled by a controller 44. Further, the first isolation valve 27 and the optional valve 43 may comprise the inventive valve shown and described with reference to FIGS. 2A and 2B, in order to further improve performance of the valve system 11. In the following example, valves 27 and 43 are assumed to be the inventive valve of FIGS. 2A and 2B.

Figure 2B:
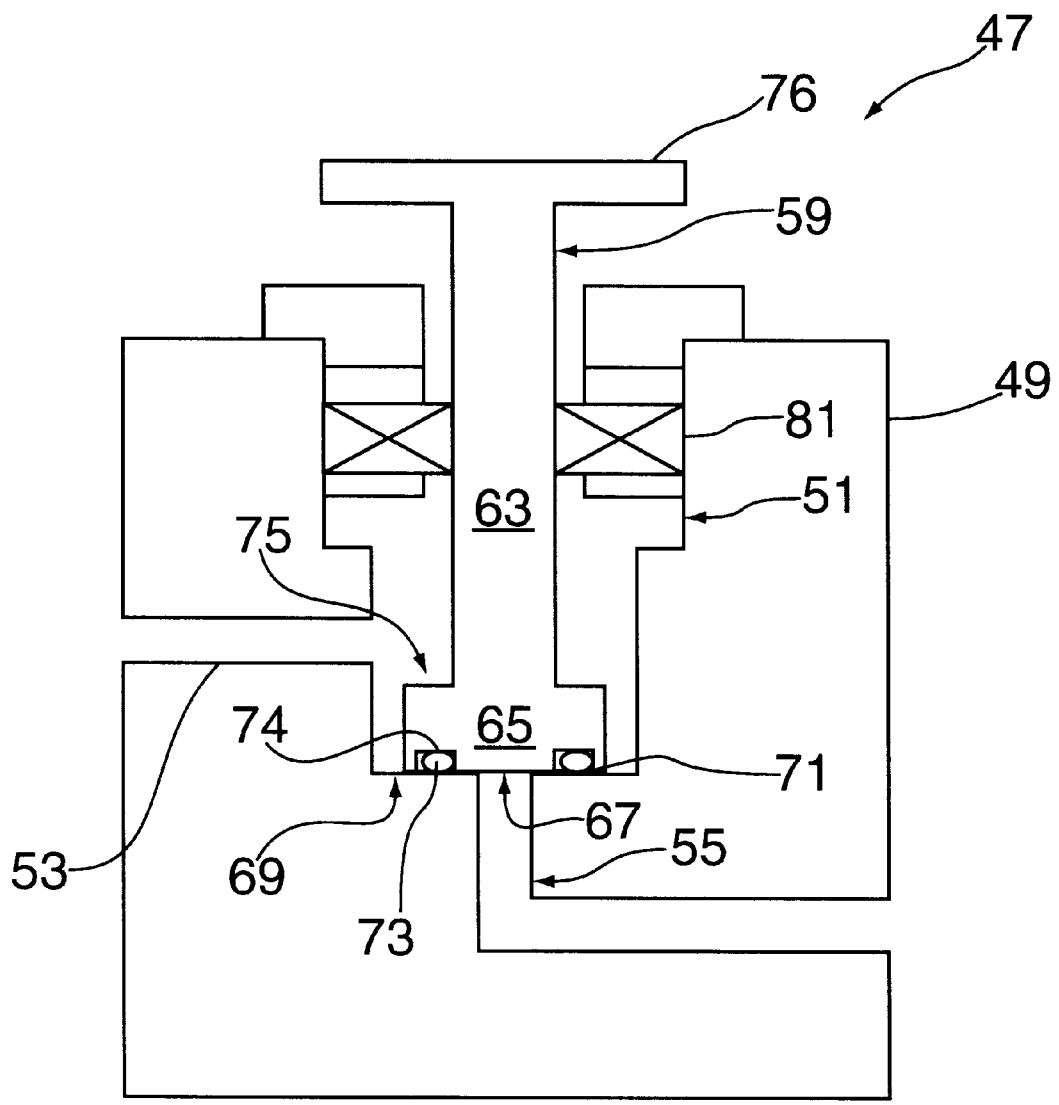

In operation, in order to provide high pressure fluid to the processing chamber 15, the first isolation valve 27 and the third isolation valve 37 are opened, and the second isolation valve 35 is closed. The optional valve 43 is opened because like the first isolation valve 27 (assuming both valves 27 and 43 are configured as shown in FIGS. 2A–B), optional valve 43 can only withstand high pressure when it is open. As high pressure fluid flows through the main fluid passageway 17 each point along the main fluid passageway 17 is maintained at a high pressure. To prevent high pressure fluid from escaping through the vent 41, high pressure valve 41a is closed.

Next, the processing chamber 15 is evacuated by first closing the third isolation valve 37 to isolate the main fluid passageway 17 from the high pressure source 13, and by opening valve 41a to allow the high pressure fluid within the main fluid passageway 17 to flow through the vent 41. The valve system 11 is thereby reduced from high pressure (e.g.,. 12,000 psi) to pressures of 500 psi or less. Thereafter the pressure within the valve system 11 is low enough that the inventive isolation valves 27 and 43 are able to seal against vacuum pressures. Therefore, the second isolation valve 35 is opened and the first (inventive) isolation valve 27 and the optional (inventive) valve 43 are closed. The processing chamber 15 is then evacuated to high vacuum (e.g.,. low pressure) via vacuum plumbing (not shown). After the processing chamber 15, reaches a desired high vacuum pressure, a processed wafer (not shown) is transferred from the processing chamber 15, and a new wafer is placed within the processing chamber 15 for high pressure processing.

To pressurize the processing chamber 15 the second isolation valve 35 and the high pressure valve 41a are closed and the first (inventive) isolation valve 27 and the optional (inventive) valve 43 are opened. Thereafter, the third isolation valve 37 is opened and high pressure fluid from high pressure source 13 flows through the main fluid passageway 17 to the processing chamber 15. Accordingly each valve experiences the following pressures while the processing chamber 15 is evacuated:

1) the first isolation valve 27 is closed and exposed to vacuum pressure on the side nearest the processing chamber 15, and to less than 100 psi on the side nearest the branch fluid passageway 19;
2) the second isolation valve 35 is open and therefore experiences no pressure differential;
3) the third isolation valve 37 is closed and exposed to up to 23 kpsi on the side nearest the high pressure source 13, and to less than 100 psi on the side nearest the branch fluid passage way 19;
4) the optional valve 43 is closed and experiences vacuum pressure on the side nearest the processing chamber 15 and less than 100 psi on the side nearest the vent 41; and
5) high pressure valve 41a is open and therefore experiences no pressure differential.

Thus, due to the inventive branch fluid passageway 19, no isolation valve is simultaneously exposed to both a vacuum pressure and a pressure above 100 psi.

Figure 1B:
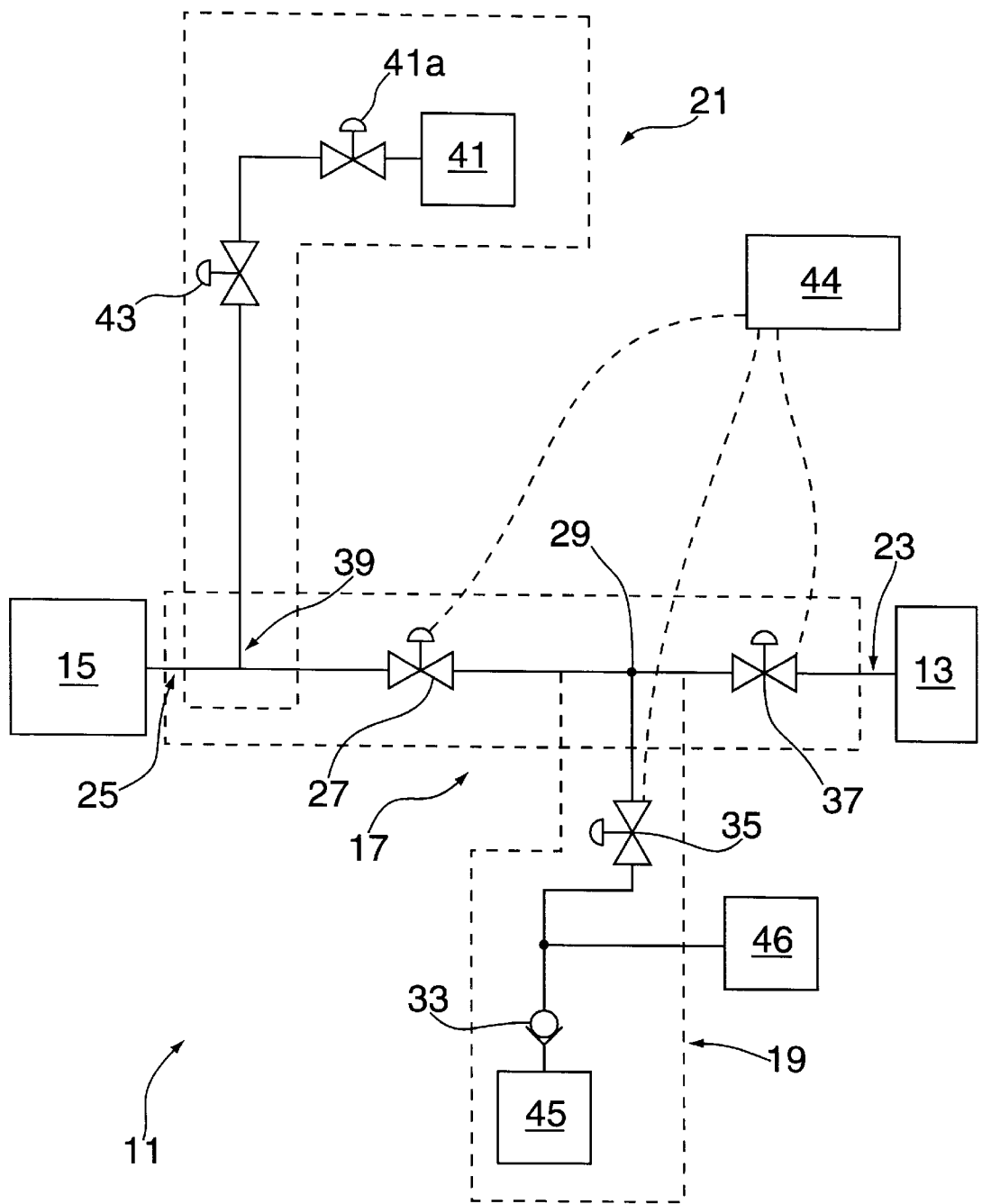
FIG. 1B is a schematic view of the inventive valve system of FIG. 1A that employs a pressurized gas source to reduce the pressure differential across the system's high pressure/vacuum valves.

FIG. 1B is a schematic view of the valve system 11 of FIG. 1A wherein the first vent 31 of FIG. 1A is replaced by a source of intermediately low pressure fluid 45, and wherein the check valve 33 prevents fluid from flowing from the main fluid passageway 17 into the source of intermediately low pressure fluid 45. The branch fluid passageway 19 of FIG. 1B also comprises a relief valve 46 for relieving high pressure which may enter the branch fluid passageway 19 from the main fluid passageway 17. The source of intermediately low pressure fluid 45 preferably comprises a source of clean, non-reactive gas, such as argon, at a pressure in the range of 10 to 200 psi, and most preferably at 65 psi.

The valve system 11 of FIG. 1B operates in the same manner as the valve system 11 of FIG. 1A with the exception that when the first isolation valve 27 and the third isolation valve 37 are closed (e.g., when the processing chamber 15 is at vacuum pressure) and the second isolation valve 35 is opened, the region between the first isolation valve 27 and the third isolation valve 37 is placed at an intermediately low pressure (e.g., at 65 psi).

Accordingly each valve experiences the following pressures while the processing chamber 15 is being evacuated:

1) the first isolation valve 27 is closed and exposed to vacuum pressure on the side nearest the processing chamber 15, and to 65 psi on the side nearest the branch fluid passage way 19;
2) the second isolation valve 35 is open and therefore experiences no pressure differential;
3) the third isolation valve 37 is closed and exposed to up to 23 kpsi on the side nearest the high pressure source 13, and to 65 psi on the side nearest the branch fluid passageway 19;
4) the optional valve 43 is closed and experiences vacuum pressure on the side nearest the processing chamber 15 and less than 100 psi on the side nearest the vent 41; and
5) high pressure valve 41a is open and therefore experiences no pressure differential.

Thus, due to the inventive branch fluid passageway 19, no isolation valve is simultaneously exposed to both a vacuum pressure and a high pressure (e.g., 23 kpsi).

Figure 1C:
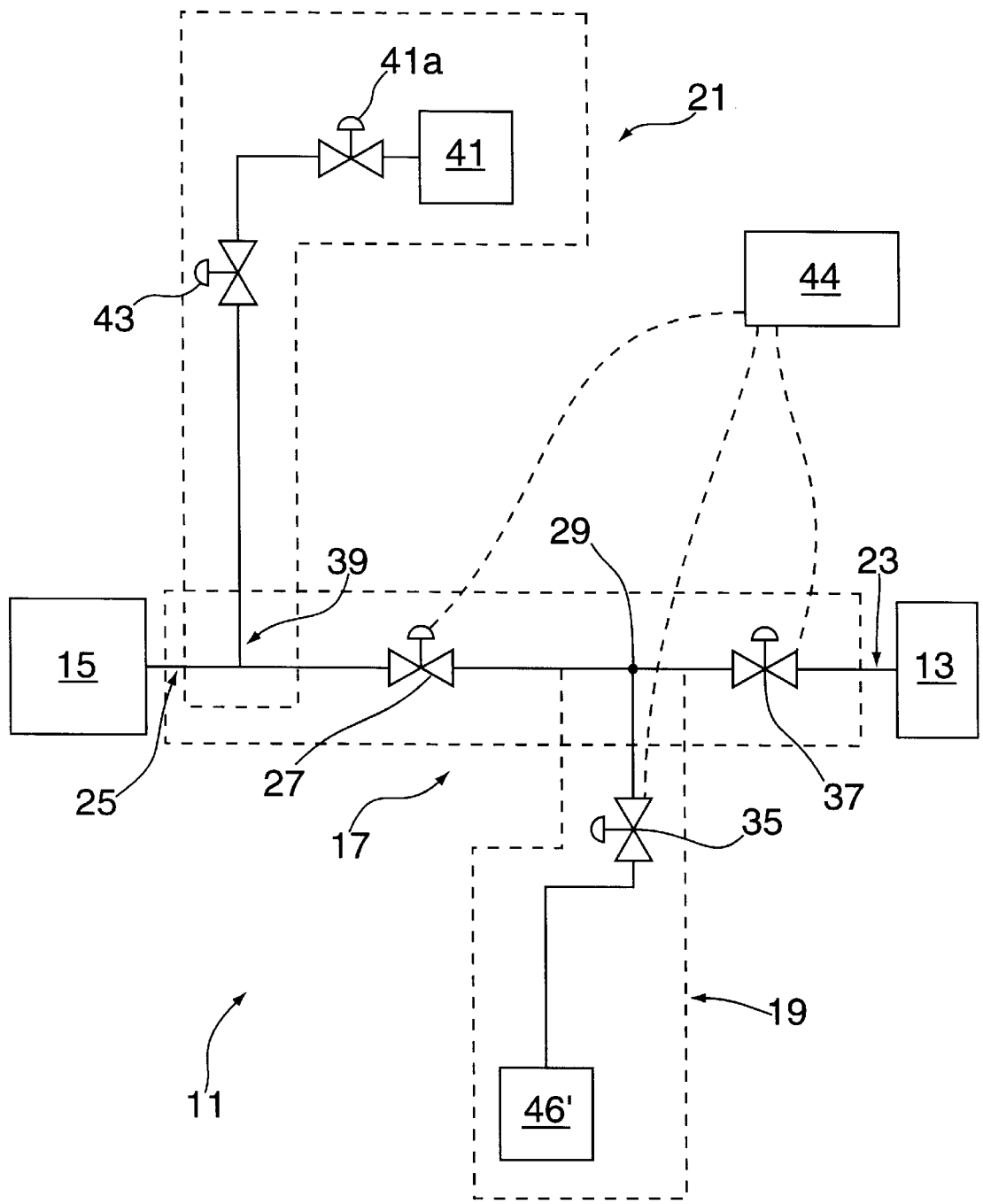
FIG. 1C is a schematic view of the inventive valve system of FIG. 1A that employs a vacuum pump to reduce the pressure differential across the system's high pressure/vacuum valves.

FIG. 1C is a schematic view of the valve system 11 of FIG. 1A wherein the first vent 31 and the first check valve 33 of FIG. 1A are replaced by a vacuum pump 46$^1$. Preferably the vacuum pump 46$^1$ is a rough pump (preferably producing pressures less than 10 Torr) for providing high mass flow rates.

The valve system 11 of FIG. 1C operates in the same manner as the valve system 11 of FIG. 1A with the exception that when the first isolation valve 27 and the third isolation valve 37 are closed and the second isolation valve 35 is opened, the region between the first isolation valve 27 and the second isolation valve 35 is placed at an intermediate vacuum pressure (i.e., a vacuum pressure of greater pressure than the vacuum pressure within the processing chamber 15).

Accordingly each valve experiences the following pressures while the processing chamber 15 is being evacuated:

1) the first isolation valve 27 is closed and exposed to vacuum pressure on the side nearest the processing chamber 15, and to an intermediate vacuum pressure on the side nearest the branch fluid passage way 19;
2) the second isolation valve 35 is open and therefore experiences no pressure differential;
3) the third isolation valve 37 is closed and exposed to up to 23 kpsi on the side nearest the high pressure source 13, and to an intermediate vacuum pressure on the side nearest the branch fluid passage way 19;
4) the optional valve 43 is closed and experiences vacuum pressure on the side nearest the processing chamber 15 and less than 100 psi on the side nearest the vent 41; and
5) high pressure valve 41a is open and therefore experiences no pressure differential.

Thus, due to the inventive branch fluid passageway 19, no isolation valve is simultaneously exposed to both high vacuum and high pressure.

By reducing the pressure differential experienced by each isolation valve, the valve system of the present invention exhibits much more effective sealing than prior art valve systems. The performance of the inventive valve system 11 can be further enhanced by employing the inventive valve 47 shown in FIGS. 2A and 2B. The inventive valve 47 provides more effective sealing over a much longer lifetime than that provided by conventional high pressure/vacuum valves as described below.

FIGS. 2A and 2B are side elevational views, in section, of a valve 47 of the present invention. The inventive valve 47 comprises a high pressure housing 49 (i.e., a housing configured to withstand high pressure) that defines a chamber 51, having an inlet port 53 for operatively coupling to a source of high pressure fluid (not shown), and an outlet port 55 for operatively coupling to a processing chamber (not shown). In the preferred embodiment of the invention, the processing chamber is a chamber which selectively cycles between high pressure and vacuum pressure, and thus the valve prevents leakage of gas into the processing chamber when the processing chamber is at vacuum pressure. However the processing chamber can be any other kind of chamber, such as a hot isostatic or cold isostatic processing chamber, or other volume where control of gas flow therein is required or desired.

A moveable member, e.g., stem or piston 59, is at least partially contained within the chamber 51 and is moveable between a sealed position and an opened position (described below). The piston 59 preferably comprises a stem 63, and a sealing plate 65. The sealing plate 65 has a sealing surface 67 that faces the outlet port 55. The sealing plate 65 has a circumference larger than the circumference of the outlet port 55. In this manner the sealing surface 67 overlaps the outlet port 55 and extends along a chamber surface 69 adjacent the outlet port 55. Accordingly, when the piston 59 moves into a sealed position (as shown in FIG. 2B) wherein the sealing surface 67 covers the outlet port 55, the sealing surface 67 and the chamber surface 69 are pressed together forming an interface 71.

The sealing surface 67 preferably comprises a resilient material such as an O-ring 73 that is positioned on the portion of the sealing surface 67 that interfaces with the chamber surface 69. Preferably the O-ring 73 is located within a groove 74 in the sealing surface 67. In a preferred embodiment, the sealing surface 67 is parallel to the chamber surface 69, and the circumference of the sealing plate 65 is larger than the circumference of the stem 63. This preferred configuration of the piston 59 enhances the effectiveness of the inventive valve 47. Specifically, when the piston 59 is in its sealed position (as shown in FIG. 2B), high pressure fluid entering the chamber 51 through the inlet port 53 and exerts a force on a top surface 75 of the sealing plate and thereby pushes the sealing surface 67 firmly against the chamber surface 69.

The chamber 51 is preferably configured such that when the piston 59 is in the opened position (FIG. 2A), the sealing plate 65 moves a sufficient distance from the chamber surface 69 and the inlet port 53 so that the flow of pressurized fluid will neither damage the O-ring 73, nor dislodge the O-ring 73 from the groove 74, destroying the high pressure/vacuum valve's 47 ability to form a vacuum seal, and contaminating both the high pressure fluid and the processing chamber. It will be understood that the distance required between the sealing plate 65 and the inlet port 53, and between the sealing plate 65 and the chamber surface 69, will vary depending upon the pressure and flow rate of the high pressure fluid, the sizing of the various chamber components, and the properties of the resilient material employed.

To provide a seal against high pressure fluid, the chamber 51 contains a packing 81 (located in the region of the chamber 51 above the inlet port 53) configured for high pressure sealing. The packing 81 comprises high pressure sealing material and is operatively coupled between the stem 63 and the walls of the chamber 51 so as to provide a high pressure seal as is conventionally known in the art.

A conventional manual or automatic actuator, generally represented by reference numeral 76, operatively couples to the movable member (e.g., to the stem 63) to cause the movable member to move between the sealed and opened positions. Preferably the actuator 76 comprises a pneumatic cylinder.

In operation, the inlet port 53 of the inventive valve 47 is operatively coupled (via one or more intermediate valves) to a source of high pressure (e.g., up to 23 kpsi) fluid (not shown) and the outlet port 55 is operatively coupled (via one or more intermediate valves) to a processing chamber (not shown), in the preferred embodiment a processing chamber that is selectively maintained at vacuum pressures. First, to provide the high pressure fluid to the processing chamber, the actuator 76 causes the piston 59 to assume the opened position as shown in FIG. 2A. That is, the piston 59 is positioned such that the sealing surface 67 is not in contact with the chamber surface 69. High pressure fluid flows from the high pressure source into the inlet port 53, through the chamber 51, and out the outlet port 55. The packing 81 forms a seal between the stem 63 and the walls of the chamber 51 to prevent contamination of the high pressure fluid from the ambient environment in which the inventive valve 47 is located and to prevent pressure loss do to leakage. The resilient O-ring 73 does not obstruct the high pressure fluid flow and therefore does not degenerate.

Next, in order to evacuate the processing chamber, the actuator 76 causes the piston 59 to move into the sealed position such that the sealing surface 67 covers the outlet port 55 and contacts the chamber surface 69, as shown in FIG. 2B. The portion of the sealing surface 67 that contacts the chamber surface 69 is metal, thus serving as a hard stop to limit compression of the resilient seal. (It will be understood that the operation of the piston 59 may be manually or automatically controlled). As described previously with reference to FIGS. 1A–C, a branch fluid passageway reduces the high pressure fluid to an intermediate pressure prior to moving the piston 59 into the sealed position. The intermediate pressure fluid flows in the inlet port 53 into the chamber 51, and is obstructed by the sealing plate 65. The predominant portion of the intermediate pressure fluid entering the chamber 51 flows into the cavity between the sealing plate's top surface 75 and the packing 81, thereby exerting pressure on the sealing plate's top surface 75 and forcing the sealing surface 67 firmly against the chamber surface 69. A portion of the intermediate pressure fluid travels along the edge of the sealing plate 65 and enters the groove 74, forcing the O-ring 73 against the far side of the groove 74 (FIG. 2B). As the O-ring 73 is forced against the far side of the groove 74 the O-ring 73 deforms, filling any interstitial spaces that may exist in the chamber surface 69, the top of the groove 74 and the far side of the groove 74. The intermediate pressure fluid is thus effectively sealed from the outlet port 55. In fact, even if high pressure fluid should inadvertently flow into the chamber 51, the inventive valve 47 will maintain an effective seal. However, the resilient seal of the inventive valve will degrade if the inventive valve were to open while under such high pressure.

Meanwhile, the packing 81 continues to seal between the stem 63 and the walls of the chamber 51. The processing chamber (not shown) is pumped to a vacuum pressure and the O-ring 73 (which is configured to withstand vacuum pressures without degrading, as is conventionally known in the art) continues to isolate the intermediate pressure fluid from the outlet port 55.

In this manner, the inventive valve 47 seals effectively despite the high pressure differential it experiences. In fact, as the pressure differential increases, the sealing surface 67 is pushed (via high pressure) more tightly against the valve chamber surface 69, and the outlet 55 is more tightly sealed. When the inventive valve 47 is employed within the inventive valve system 11 as described above with reference to FIGS. 1A–C), the reduced pressure differential across the inventive valve 47 enables the inventive valve to open without extrusion of the resilient O-ring 73.

The foregoing description discloses only the preferred embodiments of the invention, modifications of the above disclosed apparatus and method which fall within the scope of the invention will be readily apparent to those of ordinary skill in the art. For instance, the inventive valve system can be employed within a system that includes various other features such as manual valves, fine metering valves, a plurality of outlet branches having isolation valves coupled therein for providing a staged pressure reduction, and a plurality of inlet branches having isolation valves coupled therein for providing a staged pressure increase.

The inventive valve may comprise any vacuum sealing apparatus, and is not limited to the O-ring described. Likewise, the inventive valve is not limited to a piston type moveable member or to the high pressure packing disclosed, and the orientation of the various valve components can be changed while remaining within the scope of the present invention. Although the sealing plate, stem and outlet port are described with reference to their circumferences, it will be understood that these components may assume other, non-circular shapes.

Accordingly, while the present invention has been disclosed in connection with the preferred embodiments thereof, it should be understood that other embodiments may fall within the spirit and scope of the invention, as defined by the following claims.

The invention claimed is:

1. A valve system adapted to selectively provide high pressure fluid to a processing chamber during high pressure operations and to selectively seal high pressure fluid from the processing chamber during vacuum operations, comprising:

a main fluid passageway, comprising:
   a high pressure source inlet adapted to couple to a source of fluid having a high pressure; and
   a chamber outlet adapted to couple to a processing chamber that operates at the high pressure and at a vacuum pressure;
   a first isolation valve coupled to the main fluid passageway at a first location;
a branch fluid passageway coupled to the main fluid passageway at a second location between the first isolation valve and the high pressure source inlet comprising:

a pressure differential altering mechanism; and a second isolation valve coupled between the second location and the pressure differential altering mechanism;

a third isolation valve coupled between the second location and the high pressure source inlet; and a controller coupled to the first, second and third isolation valves, and adapted to open the second valve when the first and third isolation valves are closed so as to adjust the pressure of the main fluid passageway disposed between the first and third isolation valves to a pressure intermediate the vacuum pressure and the high pressure such that the first and third isolation valves are not simultaneously exposed to the vacuum pressure and the high pressure.

2. The valve system of claim 1 wherein the pressure differential altering mechanism comprises a vent.

3. The valve system of claim 1 wherein the pressure differential altering mechanism comprises a source of pressurized gas.

4. The valve system of claim 3 wherein the source of pressurized gas provides gas at a pressure less than the pressure provided by the source of high pressure fluid.

5. The valve system of claim 1 wherein the pressure differential altering mechanism comprises a vacuum pump.

6. The valve system of claim 5 wherein the vacuum pump comprises a rough pump.

7. The valve system of claim 1 wherein the first isolation valve comprises:

a housing;

a chamber defined by the housing comprising:

an inlet port;

an outlet port; and a moveable member comprising a surface that faces the outlet port adapted to selectively seal and unseal the outlet port, wherein a first chamber portion comprising the outlet port and the surface of the moveable member that faces the outlet port is configured for low pressure sealing and wherein a second chamber portion in continuous fluid communication with a high pressure fluid supplied through the inlet port is configured for high pressure sealing.

8. The valve system of claim 7 wherein the valve housing is configured to hold high pressure fluid.

9. The valve system of claim 7 wherein the moveable member comprises a piston and wherein the second chamber portion comprises high pressure packing between the piston and walls of the chamber.

10. The valve system of claim 9 wherein the piston comprises a stem portion and a surface that faces the outlet port, wherein the surface that faces the outlet port has a circumference greater than the stem thereby allowing pressurized fluid to force the surface that faces the outlet port against the outlet port.

11. The valve system of claim 7 wherein the moveable member surface that faces the outlet port comprises a resilient material.

12. The valve system of claim 7 wherein the moveable member surface that faces the outlet port comprises a vacuum O-ring configured to selectively seal the outlet port.

13. The valve system of claim 7 wherein the inlet port is adapted to couple to a source of high pressure fluid, and the outlet port is adapted to couple to a processing chamber.

14. A valve system adapted to vent pressurized fluid from a chamber, and adapted to isolate the chamber from backflow while the chamber is at a vacuum pressure, comprising:

an outlet fluid passageway comprising:

a chamber outlet port adapted to couple to a chamber to receive pressurized fluid from the chamber;

a vent coupled to the outlet fluid passageway;

a high pressure valve coupled to the outlet fluid passageway at a location between the vent and the chamber outlet port; and an isolation valve comprising:

a housing;

a chamber defined by the housing comprising:

an inlet port;

an outlet port; and a moveable member comprising a surface that faces the outlet port adapted to selectively seal and unseal the outlet port;

wherein a first chamber portion comprising the outlet port and the surface of the moveable member that faces the outlet port is configured for low pressure sealing and wherein a second chamber portion in continuous fluid communication with a high pressure fluid supplied through the inlet port is configured for high pressure sealing; and wherein the moveable member surface that faces the outlet port comprises a resilient material coupled to the outlet fluid passageway such that the outlet port of the isolation valve is nearest the chamber outlet port of the outlet fluid passageway, and such that the inlet port of the isolation valve is nearest the vent.

15. The valve system of claim 14 further comprising:

a main fluid passageway, comprising:

a high pressure source inlet adapted to couple to a source of high pressure fluid; and a chamber outlet adapted to couple to the processing chamber; and a first isolation valve coupled to the main fluid passageway at a first location; and a branch fluid passageway coupled to the main fluid passageway at a second location between the first isolation valve and the high pressure source inlet comprising:

a pressure differential altering mechanism;

a second isolation valve coupled between the second location and the pressure differential altering mechanism; and a third isolation valve coupled between the second location and the high pressure source inlet;

wherein the first isolation valve comprises:

a housing;

a chamber defined by the housing comprising:

an inlet port;

an outlet port; and a moveable member comprising a surface that faces the outlet port for selectively sealing and unsealing the outlet port;

wherein a first chamber portion comprising the outlet port and the surface of the moveable member that faces the outlet port is configured for low pressure sealing and wherein a second chamber portion in continuous fluid communication with a high pressure fluid supplied through the inlet port is configured for high pressure sealing.

* * * * *